United States Patent
Fish

(10) Patent No.: US 12,028,671 B2
(45) Date of Patent: Jul. 2, 2024

(54) PASSIVE ANALOG BYPASS FOR USB PERIPHERAL AUDIO DEVICES

(71) Applicant: Hewlett-Packard Development Company, L.P., Spring, TX (US)

(72) Inventor: Dennis Fish, Santa Cruz, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 386 days.

(21) Appl. No.: 17/489,672

(22) Filed: Sep. 29, 2021

(65) Prior Publication Data
US 2023/0118417 A1 Apr. 20, 2023

(51) Int. Cl.
*H04R 1/10* (2006.01)
*G06F 3/16* (2006.01)
*H04R 3/00* (2006.01)

(52) U.S. Cl.
CPC .......... *H04R 1/1041* (2013.01); *G06F 3/162* (2013.01); *H04R 3/00* (2013.01); *H04R 2420/09* (2013.01)

(58) Field of Classification Search
CPC ......... G06F 3/162; H04R 1/1041; H04R 3/00; H04R 2420/09
See application file for complete search history.

(56) References Cited

U.S. PATENT DOCUMENTS

| 2015/0199169 A1* | 7/2015 | Manley | G06F 3/165 710/106 |
| 2016/0041808 A1* | 2/2016 | Pelland | G06F 3/162 700/94 |
| 2016/0192056 A1* | 6/2016 | Goldman | H04R 27/00 381/74 |
| 2018/0046429 A1* | 2/2018 | Jensen | G06F 13/426 |
| 2018/0173661 A1* | 6/2018 | Rand | H04R 3/12 |
| 2019/0261076 A1* | 8/2019 | Lambert | H04R 3/00 |

* cited by examiner

*Primary Examiner* — Henry Tsai
*Assistant Examiner* — John B Roche
(74) *Attorney, Agent, or Firm* — Quarles & Brady LLP

(57) ABSTRACT

A Universal Serial Bus (USB) audio device kit includes a USB peripheral audio device and a passive USB-to-analog audio adapter. The USB peripheral audio device includes a USB interface configured to communicatively interface the USB audio peripheral device with a USB host device. The passive USB-to-analog audio adapter is configured to electrically interface the USB peripheral audio device with analog audio equipment via the USB interface.

20 Claims, 3 Drawing Sheets

PASSIVE ANALOG BYPASS FOR USB PERIPHERAL AUDIO DEVICES

FIELD

The present disclosure relates generally to the field of Universal Serial Bus (USB) peripheral audio devices. More particularly, the present disclosure relates to an analog bypass for USB peripheral audio devices, enabling the use of the USB peripheral audio devices with analog audio equipment.

BACKGROUND

A USB peripheral audio device (e.g., a headset) may be connected to a USB host device (e.g., a personal computer, a smartphone, etc.). A USB audio controller of the USB peripheral audio device may perform a conversion between digital USB signals and audio signals. Without additional circuitry or adapters, the USB peripheral audio device may not be suitable for connection to analog audio equipment.

SUMMARY

In general, in one aspect, one or more embodiments relate to a Universal Serial Bus (USB) peripheral audio device comprising: a speaker; a USB interface configured to communicatively interface the USB peripheral audio device with a USB host device; a USB audio controller configured to provide a first analog audio signal to the speaker, based on a digital audio signal on the USB interface, when the audio device operates in a USB audio mode; and an analog audio bypass configured to electrically interface the speaker with the USB interface to provide a second analog audio signal to the speaker, when the audio device operates in an analog audio mode, wherein the second analog audio signal is received on the USB interface and bypasses the USB audio controller.

In general, in one aspect, one or more embodiments relate to a Universal Serial Bus (USB) audio device kit comprising: a USB peripheral audio device comprising: a USB interface configured to communicatively interface the USB audio peripheral device with a USB host device; and a passive USB-to-analog audio adapter configured to electrically interface the USB peripheral audio device with analog audio equipment via the USB interface.

In general, in one aspect, one or more embodiments relate to a passive Universal Serial Bus (USB)-to-analog audio adapter comprising: a USB receptacle configured to receive a USB plug of a USB peripheral audio device; an analog audio connector configured to connect to analog audio equipment; and wiring to electrically passively connect the USB receptacle and the analog audio connector.

Other aspects of the invention will be apparent from the following description and the appended claims.

DETAILED DESCRIPTION

Embodiments of the disclosure enable a USB peripheral audio device that is suitable for connection to analog audio equipment. The USB interface of the USB peripheral audio device, in one or more embodiments, is repurposed to carry analog audio signals for the analog audio equipment.

A USB peripheral audio device, in accordance with one or more embodiments, is configured to operate in two different operating modes. When in a USB audio mode, the USB audio device may operate using digital audio signals exchanged with a USB host device via the USB interface of the USB peripheral audio device. When in the USB audio mode, the USB interface carries digital audio signals but not analog audio signals. When in an analog audio mode, the USB peripheral audio device may operate using analog audio signals exchanged with an analog audio equipment via the USB interface of the USB peripheral audio device. When in the analog audio mode, the USB interface is repurposed to carry analog audio signals, but not digital audio signals.

A connection to any kind of analog audio equipment may be made when the USB peripheral audio device is in the analog audio mode. For example, the USB peripheral audio device may be connected to a smartphone with an analog audio output, a tape recorder, a TV, etc. The analog audio equipment may be any kind of equipment capable of serving as an analog audio source, an analog audio sink, or both.

A physical USB-to-analog audio adapter may be used to connect the USB peripheral audio device to the analog audio equipment, at the USB interface. In one or more embodiments, a set of switches is used to switch between the analog audio mode and the USB audio mode. No additional power source, in addition to the USB supply voltage, may be needed by the USB peripheral audio device. When in the USB audio mode, the USB peripheral audio device may thus operate powered by the USB supply voltage. When in the analog audio mode, the USB peripheral audio device may operate passively, without power source.

Embodiments of the disclosure, thus, add versatility to wired USB headsets. The additional elements used to support the analog audio mode, in addition to the USB audio mode, are low-cost and do not require a power source in addition to the USB supply voltage. A detailed description is subsequently provided.

Figure 1:
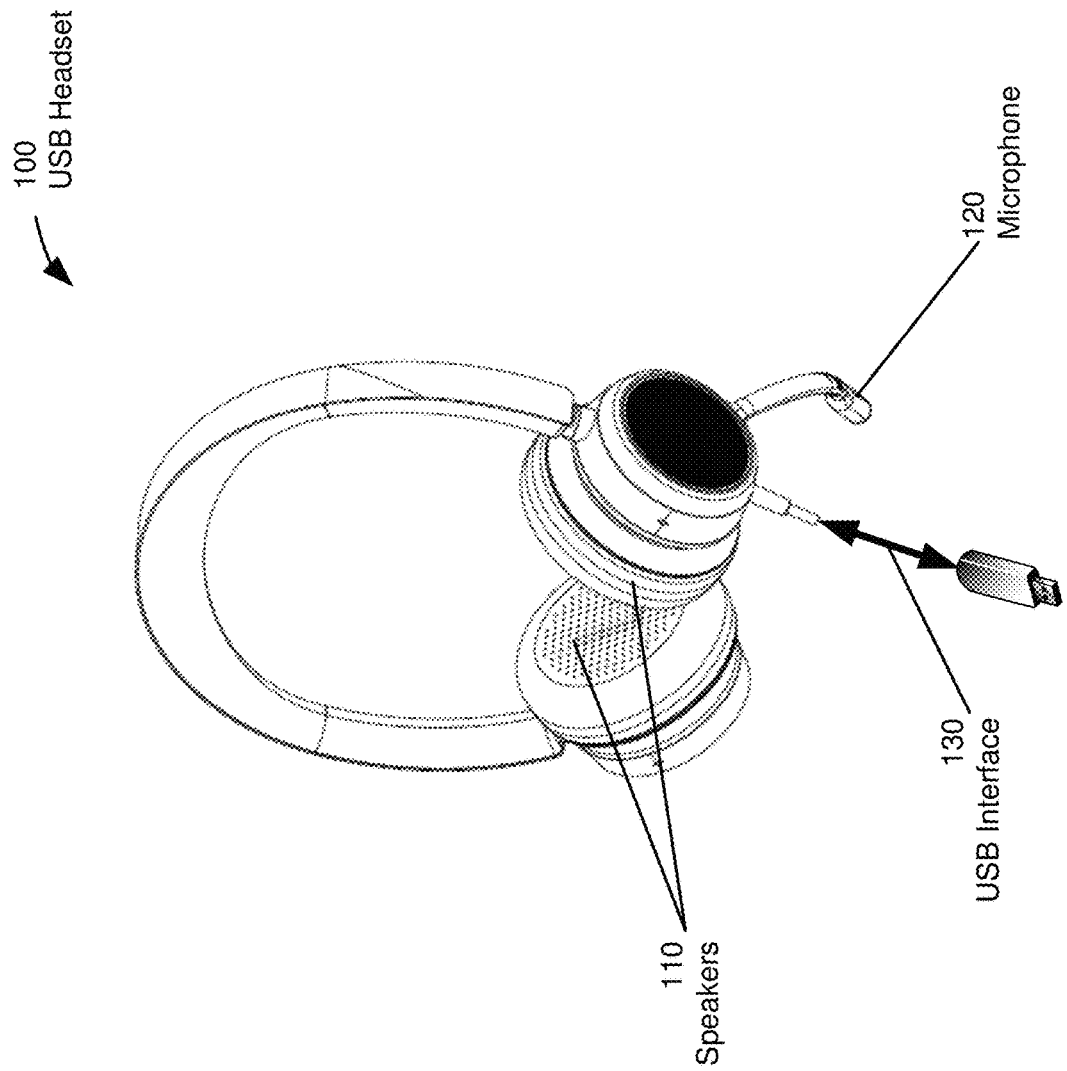
FIG. 1 shows a USB headset, in accordance with one or more embodiments of the disclosure.

Turning to FIG. 1, a USB headset (100), in accordance with one or more embodiments, is shown. The USB headset (100) includes speakers (110), a microphone (120), and a USB interface (130) in accordance with one or more embodiments of the invention. The USB headset (100) may be of any shape and configuration, without departing from the disclosure. For example, the USB headset (100) may be an on-ear or in-ear type headset, with or without a headband or a neckband. The USB headset (100) may include one or more speakers and may be a mono or stereo headset. The USB headset (100) may or may not include the microphone (120). The USB interface (130) may include any USB connector, e.g., a USB Type-C connector, to connect the USB headset to a USB host device.

Figure 2:
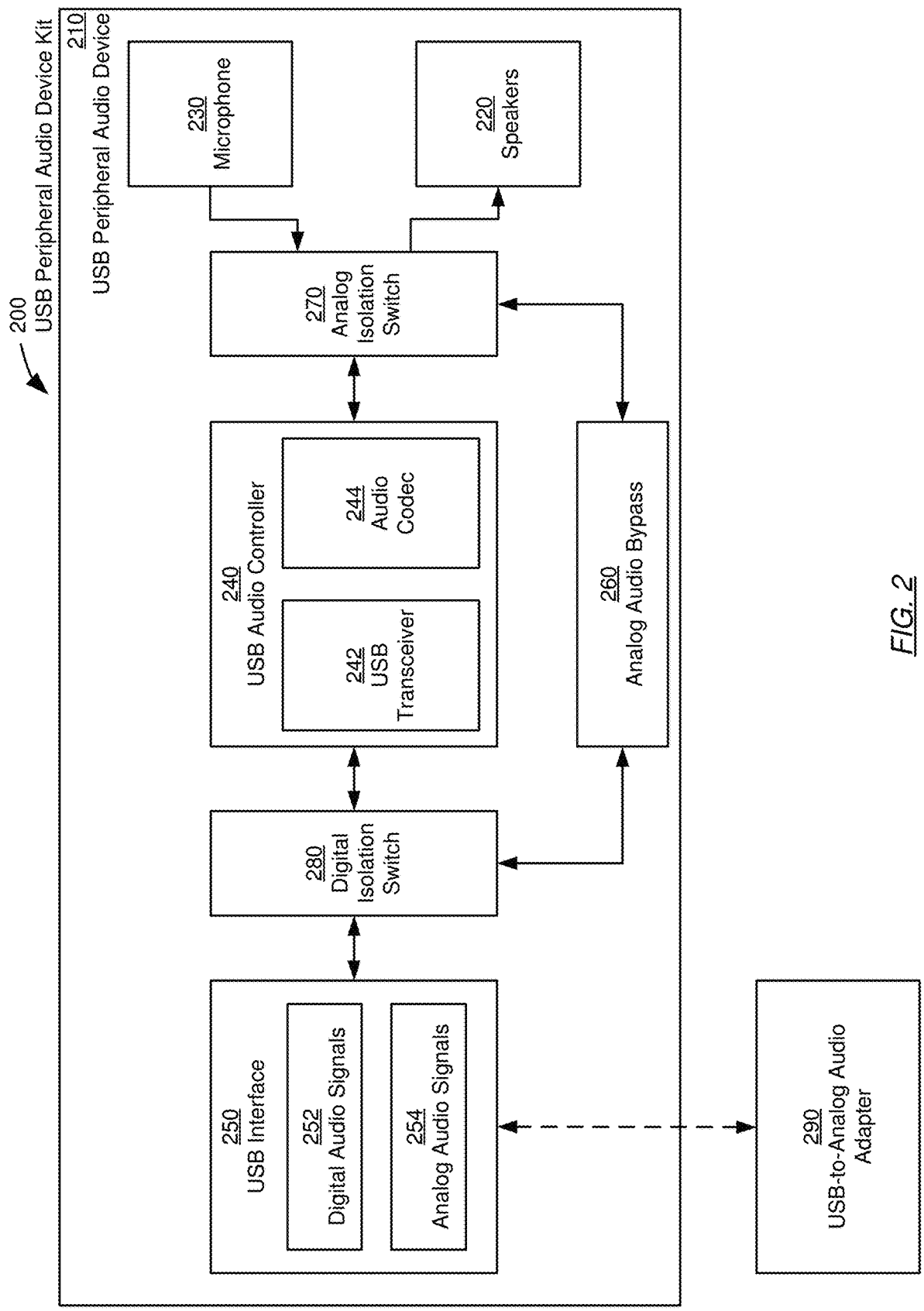
FIG. 2 shows a USB peripheral audio device kit, in accordance with one or more embodiments of the disclosure.

Turning to FIG. 2, a USB peripheral audio device kit (200), in accordance with one or more embodiments, is shown. The USB peripheral audio device kit (200) includes a USB peripheral audio device (210) and one or more USB-to-analog audio adapters (290), in accordance with embodiments of the invention. The peripheral USB audio device (210) may be a USB headset, as shown in FIG. 1, or any other USB peripheral audio device such as a speaker, a microphone, combinations thereof, etc. The USB peripheral audio device (210) may include speakers (220), a microphone (230), a USB audio controller (240), a USB interface (250), an analog audio bypass (260), an analog isolation switch (270), and a digital isolation switch (280). Each of these components is subsequently described. The USB-to-analog audio adapter (290) may include plugs and/or receptacles to interface the USB peripheral audio device (210) with an analog audio equipment via the USB interface (250) of the USB peripheral audio device (210).

The speakers (220) may include any type of speakers in any configuration. For example, a single or two headset-type speakers may be used in a headset in a mono or stereo configuration. Other speakers may be used in other applications, e.g., in portable USB speakers. No speakers may be included if the USB peripheral audio device (210) is limited to obtaining audio input.

The microphone (230) may include any type of microphone in any configuration. For example, a single microphone may be used in a communication headset. Multiple microphones may be present in some peripheral audio devices, e.g., for active noise cancellation, speaker detection, etc. No microphone may be included if the USB peripheral audio device (210) is limited to providing audio output.

The USB audio controller (240), in one or more embodiments, provides audio functionality over USB. More specifically, the USB audio controller (240) includes a USB transceiver (242) and an audio codec (244). The USB transceiver (242) includes circuitry and instructions that implement the USB protocol for the USB peripheral audio device (210). The audio codec (244) interfaces with the USB transceiver (242) and provides an analog interface to the speakers (220) and the microphone (230). The audio codec (244) may include amplifiers for the speakers, a microphone booster, analog-to-digital converters, digital-to-analog converters, etc. The USB transceiver (242) and the audio codec (244) may be combined in a single integrated circuit.

The USB interface (250), in one or more embodiments, interfaces the USB peripheral audio device (210) with a host device (not shown). The USB interface (250) may include a USB connector, e.g., a USB Type-C connector or any other type of USB connector. The USB interface (250) includes at least the data signal lines, D+ and D−, a ground wire, and a power supply voltage line. Additional signal wires such as SBU1 and SBU2 may be included. If a USB Type-C connector is used for the USB interface (250), all pins (12+12 pins) or at least some of the pins may be available for connection.

When the USB peripheral audio device (210) operates in the USB audio mode, digital audio signals (252) may be carried by the USB interface (250) using the USB protocol. The digital audio signals (252) may be transmitted/received to/from a USB host device, on the data signal lines. When the USB peripheral audio device (200) operates in the analog audio mode, analog audio signals (254) may be carried by the USB interface (250). The data signal lines and/or other signal lines of the USB interface (250) may be used for the analog audio signals (254). The USB-to-analog audio adapter (290) may be used to provide a connection between the USB interface (250) of the USB peripheral audio device (200) and analog audio equipment, as described below.

The analog audio bypass (260), in one or more embodiments, provides a bypass of the USB audio controller (240) when the USB peripheral audio device (210) operates in the analog audio mode. The analog audio bypass (260) may pass the analog audio signals (254) from the microphone (230) directly to the USB interface (250), bypassing the USB audio controller (240). The analog audio bypass (260) may further pass the analog audio signals (254) from the USB interface (250) to the speakers (220), bypassing the USB audio controller (240). The analog audio bypass (260), thus, enables a repurposing of the USB interface (250) to carry the analog audio signals (254). When the USB peripheral audio device (210) operates in the USB audio mode, the analog audio bypass (260) is in an open configuration and does not pass analog signals. A detailed description of the analog audio bypass (260) is provided below in reference to FIG. 3.

The analog isolation switch (270), in one or more embodiments, is configured to electrically connect the speakers (220) and/or the microphone (230) to the USB audio controller (240) when the USB peripheral audio device (210) operates in the USB audio mode. The analog isolation switch (270), in one or more embodiments, is further configured to electrically disconnect the speakers (220) and/or the microphone (230) from the USB audio controller (240) when the USB peripheral audio device (210) operates in the analog audio mode. By disconnecting the speakers (220) and/or the microphone (230) from the USB audio controller (240), a degradation of the analog audio signals (254) by the USB audio controller (230) may be avoided. Without the disconnect, the analog audio signals (254) may feed into the USB audio controller (230), which may cause distortions, e.g., by protection diodes intended to protect the USB audio controller (240) from electrostatic discharge (ESD). These diodes (and/or other components of the USB audio controller (24)) may cause a clipping of the analog audio signals (254). A detailed description of the analog isolation switch (270) is provided below in reference to FIG. 3.

The digital isolation switch (280) in one or more embodiments, is configured to electrically connect the USB audio controller (240) to the USB interface (250) when the USB peripheral audio device (210) operates in the USB audio mode. The digital isolation switch (280), in one or more embodiments, is further configured to electrically disconnect the USB audio controller (240) from the USB interface (250) when the USB peripheral audio device (210) operates in the analog audio mode. By disconnecting the USB audio controller (240) from the USB interface (250), a degradation of the analog audio signals by the USB audio controller (240), as previously described for the analog isolation switch (270), may be avoided. The digital isolation switch (280) may be optional. For example, if the analog audio signal (254) is on signal lines of the USB interface (250) that are not electrically connected to the USB audio controller (240), then no digital isolation switch may be used.

The USB-to-analog audio adapter (290) may be used to interface the USB peripheral audio device (210) with analog audio equipment via the USB interface (250). Analog audio equipment frequently includes analog audio jacks such as 3.5 mm female jacks with, for example, two, three or four contacts. Other types of analog audio interfaces may be provided, without departing from the disclosure. The USB-to-analog audio adapter (290), in one or more embodiments includes an analog audio connector that is compatible with the analog audio jack of the analog audio equipment. The analog audio connector may be, for example, a 3.5 mm male connector. The USB-to-analog audio adapter (290), in one or more embodiments, further includes a USB connector to connect to the USB interface. The USB connector may be, for example, a USB Type-C receptacle that is compatible with the USB Type-C plug of the USB interface (250). The wiring between the analog audio connector and the USB connector of the USB-to-analog audio adapter (290) may provide the analog audio signals (254) on the contacts of the analog audio connector, in a configuration that is compatible with the analog audio equipment. Examples of USB-to-analog audio adapters (290) are provided in reference to FIG. 3.

Figure 3:
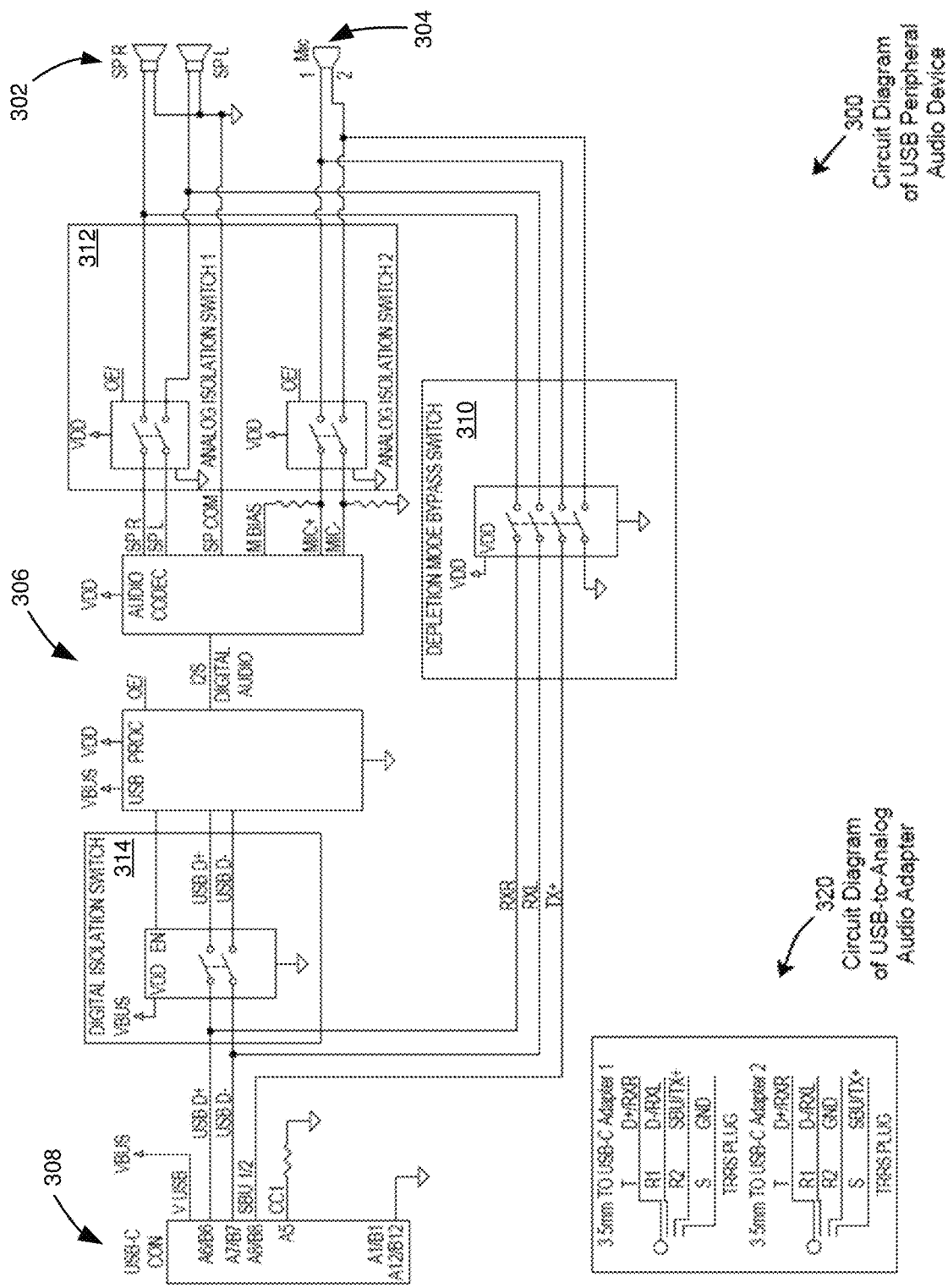
FIG. 3 shows circuit diagrams, in accordance with one or more embodiments of the disclosure.

Turning to FIG. 3, circuit diagrams, in accordance with one or more embodiments of the disclosure, are shown.

The circuit diagram (300) is for a USB peripheral audio device that may correspond to the USB peripheral audio device (210), shown in FIG. 2. The circuit diagram (300) shows a configuration that includes two speakers (302), e.g., SPL and SPR, a microphone (304), the components of a USB audio controller (306), and a USB interface (308) including a USB Type-C connector. As shown in FIG. 3, the USB audio controller (306) is coupled to an audio codec by an electrical serial bus interface I2S.

In particular, FIG. 3 depicts the analog audio bypass including a depletion mode bypass switch (310) operating on the two speaker signals, the microphone signal, and the microphone ground. The depletion mode bypass switch (310) may consist of discrete circuit elements or may be an integrated circuit. The depletion mode bypass switch may be based on a set of transistors that are normally closed, allowing current to pass, and that are triggered to open and impede current. The set of transistors may be controlled by the USB supply voltage, VDD. Accordingly, the depletion mode bypass switch (310) may be open when the USB Type-C connector of the USB peripheral audio device is connected to a USB host (e.g., when operating the USB peripheral audio device in the USB audio mode), thereby providing VDD. When the USB-C connector is not connected to a USB host (e.g., when operating the USB peripheral audio device in the analog audio mode), VDD is not available, the depletion mode bypass switch closes. Accordingly, in one or more embodiments, the presence or absence of VDD controls whether the USB peripheral audio device operate in the USB audio mode or in the analog audio mode, respectively. Connecting the USB Type-C connector to a USB Type-C receptacle of a USB host causes the USB peripheral audio device to operate in the USB audio mode. Disconnecting the USB Type-C connector from a USB Type-C receptacle of a USB host causes the USB peripheral audio device to operate in the analog audio mode.

The analog isolation switch (312) operates on the two speaker signals, the microphone signal MIC+, and the microphone ground MIC−. In some aspects, the microphone signal MIC+ is coupled to a biasing signal M BIAS. The analog isolation switch (312) may consist of discrete circuit elements or may be an integrated circuit. The analog isolation switch (312) may be based on a set of transistors that are normally open, and that are triggered to close, allowing current to pass. The set of transistors may be controlled by the USB supply voltage, VDD, and/or a signal OE/. Accordingly, the analog isolation switch (312) may be closed when the USB Type-C connector of the USB peripheral audio device is connected to a USB host (e.g., when operating the USB peripheral audio device in the USB audio mode), thereby providing VDD. When the USB Type-C connector is not connected to a USB host (e.g., when oper-ating the USB peripheral audio device in conjunction with analog audio equipment), VDD is not available, and the analog isolation switch (312) is open.

Continuing with FIG. 3, the digital isolation switch (314) operates on the data signal lines D+ and D−. The digital isolation switch (314) may consist of discrete circuit elements or may be an integrated circuit. The digital isolation switch (314) may be based on a set of transistors that are normally open, and that are triggered to close, allowing current to pass. The set of transistors may be controlled by the USB supply voltage, VDD. Accordingly, the digital isolation switch (314) may be closed when the USB Type-C connector of the USB peripheral audio device is connected to a USB host (e.g., when operating the USB peripheral audio device in the USB audio mode), thereby providing VDD to an output VBUS. When the USB Type-C connector is not connected to a USB host (e.g., when operating the USB peripheral audio device in conjunction with analog audio equipment), VDD is not available, and the digital isolation switch is open. Accordingly, only digital USB signals, exchanged with a USB host via the USB Type-C connector, may pass the digital isolation switch (314). In contrast, analog audio signals exchanged with analog audio equipment via the USB Type-C connector and a USB-to-analog audio adapter connected to the USB Type-C connector, may not pass the digital isolation switch (314). The digital isolation switch (314) is used because, in the implementation shown in the circuit diagram (300), USB Type-C pins A6/B6 and A7/E7, which are reserved for the data signal lines D+ and D−, are repurposed to carry the analog audio signals to the two speakers. In configurations that use other pins of the USB Type-C connector, the digital isolation switch may not be necessary. Any of the pins of the USB Type-C connector may be used, e.g., A1/B1, A5, A8/B8, or A12/B12, without departing from the disclosure. In addition, any of the pins of the USB Type-C connector can be coupled to the depletion mode bypass switch (310) by data signal lines RXR, RXL, TX+.

While the circuit diagram (300) of FIG. 3 shows the depletion mode bypass switch (310), the analog isolation switch (312), and the digital isolation switch (314) as being controlled by VDD, these switches may be controlled differently, without departing from the disclosure. For example, a manual switching may be performed, using a user-operated switch that enables selection between the USB audio mode and the analog audio mode.

The circuit diagram (320) of FIG. 3 is for USB-to-analog audio adapters. A USB-to-analog audio adapter may be used to provide the analog audio signals of the USB per-ipheral audio device on a connector that is compatible with analog audio equipment. A USB-to-analog audio adapter includes two connectors that are electrically interfaced as described by the circuit diagram (320). The first connector may be a USB Type-C receptacle configured to receive the USB Type-C plug of the USB peripheral audio device. The second connector may be an analog audio connector configured to plug into analog audio equipment. In one or more embodiments, the USB-to-analog audio adapter is a passive USB-to-analog audio adapter. In other words, the USB-to-analog audio adapter may include no active (powered) cir-cuit elements such as transistors, analog-to-digital con-ver-ters, digital-to-analog converters, etc. The two connec-tors of the USB-to-analog audio adapter may thus be elec-trically passively connected, e.g., via respective signal lines S, T, R1, R2, D+/RXR, D−/RXL, SBU/TX+, and/or GND.

The circuit diagram (320) of FIG. 3 shows two different configurations of 3.5 mm TRRS (tip-ring-ring-sleeve) ana-log audio connectors. The 3.5 mm analog audio connectors may be male connectors that match corresponding female connectors of the analog audio equipment. Other configu-rations, including different types of analog audio connectors, may be used, without departing from the disclosure.

An audio device kit, in accordance with an embodiment of the disclosure may include multiple USB-to-analog audio adapters to ensure compatibility with a broad range of analog audio equipment. One or more of the USB-to-analog audio adapters may be tethered to the USB cable of the USB connector (e.g., the USB Type-C connector), to ensure availability of the USB-to-analog audio adapters when needed. The user may decide to cut the tether to unused USB-to-analog audio adapters, if desired.

In the detailed description of embodiments of the invention, numerous specific details have been set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may have been used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Specific embodiments of the invention have been described in detail with reference to the accompanying figures. Like elements in the various figures are denoted by like reference numerals for consistency. Although the description includes a discussion of various embodiments of the disclosure, the various disclosed embodiments may be combined in virtually any manner. All combinations are contemplated herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A Universal Serial Bus (USB) peripheral audio device comprising:
    a speaker;
    a USB interface configured to communicatively interface the USB peripheral audio device with a USB host device;
    a USB audio controller communicatively coupled to the USB interface and to the speaker, and configured to provide a first analog audio signal to the speaker, based on a digital audio signal on the USB interface, when the USB peripheral audio device operates in a USB audio mode; and
    an analog audio bypass configured to communicatively couple the speaker with the USB interface to provide a second analog audio signal to the speaker, when the USB peripheral audio device operates in an analog audio mode,
    wherein the second analog audio signal is received on the USB interface and bypasses the USB audio controller.

2. The USB peripheral audio device of claim 1, wherein the analog audio bypass comprises a bypass switch configured to:
    when in the analog audio mode:
        electrically connect the speaker to the USB interface, and
    when in the USB audio mode:
        electrically disconnect the speaker from the USB interface.

3. The USB peripheral audio device of claim 2, wherein the bypass switch comprises a depletion mode switch controlled by a USB supply voltage.

4. The USB peripheral audio device of claim 1, further comprising:
    an analog isolation switch configured to:
        when in the analog audio mode:
            electrically disconnect the speaker from the USB audio controller, and
        when in the USB audio mode:
            electrically connect the speaker to the USB audio controller.

5. The USB peripheral audio device of claim 4, wherein the analog isolation switch is controlled by a USB supply voltage.

6. The USB peripheral audio device of claim 1, further comprising:
    a digital isolation switch configured to:
        when in the analog audio mode:
            electrically disconnect the USB audio controller from the USB interface, and
        when in the USB audio mode:
            electrically connect the USB audio controller to the USB interface.

7. The USB peripheral audio device of claim 6, wherein the digital isolation switch is controlled by a USB supply voltage.

8. The USB peripheral audio device of claim 1, wherein the USB interface is a USB Type-C interface.

9. The USB peripheral audio device of claim 1, wherein the second analog audio signal is received on one selected from the group consisting of:
    a D+ line,
    a D− line,
    a SBU1 line, and
    a SBU2 line
    of the USB interface.

10. The USB peripheral audio device of claim 1, further comprising:
    a microphone configured to provide the second analog audio signal to the USB audio controller.

11. A Universal Serial Bus (USB) audio device kit comprising:
    a USB peripheral audio device comprising:
        a USB interface configured to communicatively interface the USB audio peripheral device with a USB host device; and
        an analog audio bypass configured to electrically interface a speaker of the USB peripheral audio device with the USB interface to provide a first analog audio signal to the speaker; and
    a passive USB-to-analog audio adapter configured to electrically interface the USB peripheral audio device with analog audio equipment via the USB interface.

12. The USB audio kit of claim 11, wherein the passive USB-to-analog audio adapter is tethered to a USB cable of the USB interface.

13. The USB audio kit of claim 11,
wherein the first analog audio signal is received on the USB interface from the analog audio equipment via the passive USB-to-analog audio adapter.

14. The USB audio kit of claim 13, wherein the analog audio bypass comprises a bypass switch configured to:
when in an analog audio mode:
electrically connect the speaker to the USB interface, and
when in a USB audio mode:
electrically disconnect the speaker from the USB interface.

15. The USB audio kit of claim 14, wherein the bypass switch comprises a depletion mode switch controlled by a USB supply voltage.

16. The USB audio kit of claim 13, wherein the USB peripheral audio device further comprises:
a USB audio controller configured to provide a second analog audio signal to the speaker, based on a digital audio signal on the USB interface, when the USB peripheral audio device operates in a USB audio mode.

17. The USB audio kit of claim 16, wherein the USB peripheral audio device further comprises:
a digital isolation switch configured to:
when in an analog audio mode:
electrically disconnect the USB audio controller from the USB interface, and
when in the USB audio mode:
electrically connect the USB audio controller to the USB interface.

18. A passive Universal Serial Bus (USB)-to-analog audio adapter comprising:
a USB receptacle configured to receive a USB plug of a USB peripheral audio device;
an analog audio connector configured to connect to analog audio equipment; and
wiring to electrically passively connect the USB receptacle and the analog audio connector to provide a first analog signal from the analog audio equipment to the USB peripheral audio device.

19. The passive USB-to-analog-audio adapter of claim 18, wherein the analog audio connector is a 3.5 mm male connector.

20. The passive USB-to-analog-audio adapter of claim 18, wherein the USB receptacle is a USB Type-C receptacle.

* * * * *